United States Patent [19]
Yao et al.

[11] Patent Number: 5,580,536
[45] Date of Patent: *Dec. 3, 1996

[54] COMPOSITE OXIDE HAVING OXYGEN ABSORBING AND DESORBING CAPABILITY AND METHOD FOR PREPARING SAME

[75] Inventors: Shinyao Yao, Osaka-fu; Hideo Yokoi, Hyogo-ken; Tadatoshi Murota, Hyogo-ken; Kazuhiro Yamamoto, Hyogo-ken; Shigeru Aozasa, Hyogo-ken, all of Japan

[73] Assignee: Santoku Metal Industry Co., Ltd., Hyogo-ken, Japan

[*] Notice: The term of this patent shall not extend beyond the expiration date of Pat. No. 5,478,543.

[21] Appl. No.: 537,629

[22] Filed: Oct. 2, 1995

Related U.S. Application Data

[63] Continuation-in-part of Ser. No. 263,608, Jun. 20, 1994, Pat. No. 5,478,543.

[30] Foreign Application Priority Data

Jun. 21, 1993 [JP] Japan .................................. 5-149358
Oct. 5, 1994 [JP] Japan .................................. 6-241663

[51] Int. Cl.$^6$ .......................... C01F 17/00; C01B 13/00; C04B 35/48
[52] U.S. Cl. .......................... 423/263; 264/60; 423/579; 502/304
[58] Field of Search .................... 423/579, 593, 423/263; 502/304; 264/60

[56] References Cited

U.S. PATENT DOCUMENTS

| 5,019,366 | 5/1991 | Sakai ........................... 423/579 |
| 5,292,496 | 3/1994 | Nagashima et al. ............ 502/303 |

FOREIGN PATENT DOCUMENTS

| 103026 | 6/1985 | Japan ........................... 423/263 |
| 166222 | 8/1985 | Japan ........................... 423/263 |
| 23213 | 1/1991 | Japan ........................... 423/263 |

*Primary Examiner*—Wayne Langel
*Attorney, Agent, or Firm*—Darby & Darby, P.C.

[57] ABSTRACT

A composite oxide having oxygen absorbing and desorbing capability contains 4.99–98.89% by weight of cerium oxide, 1–95% by weight of zirconium oxide, 0.01–20% by weight of hafnium oxide, and 0.1–10% by weight of an additional metal oxide selected from titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof. The composite oxide includes Φ phase as a crystal phase, and has oxygen absorbing and desorbing capability of at least 100 μmol/g at 400°–700° C. The composite oxide is prepared by the wet method or by the dry method.

15 Claims, 2 Drawing Sheets

Diffraction Angle ($2\theta$)

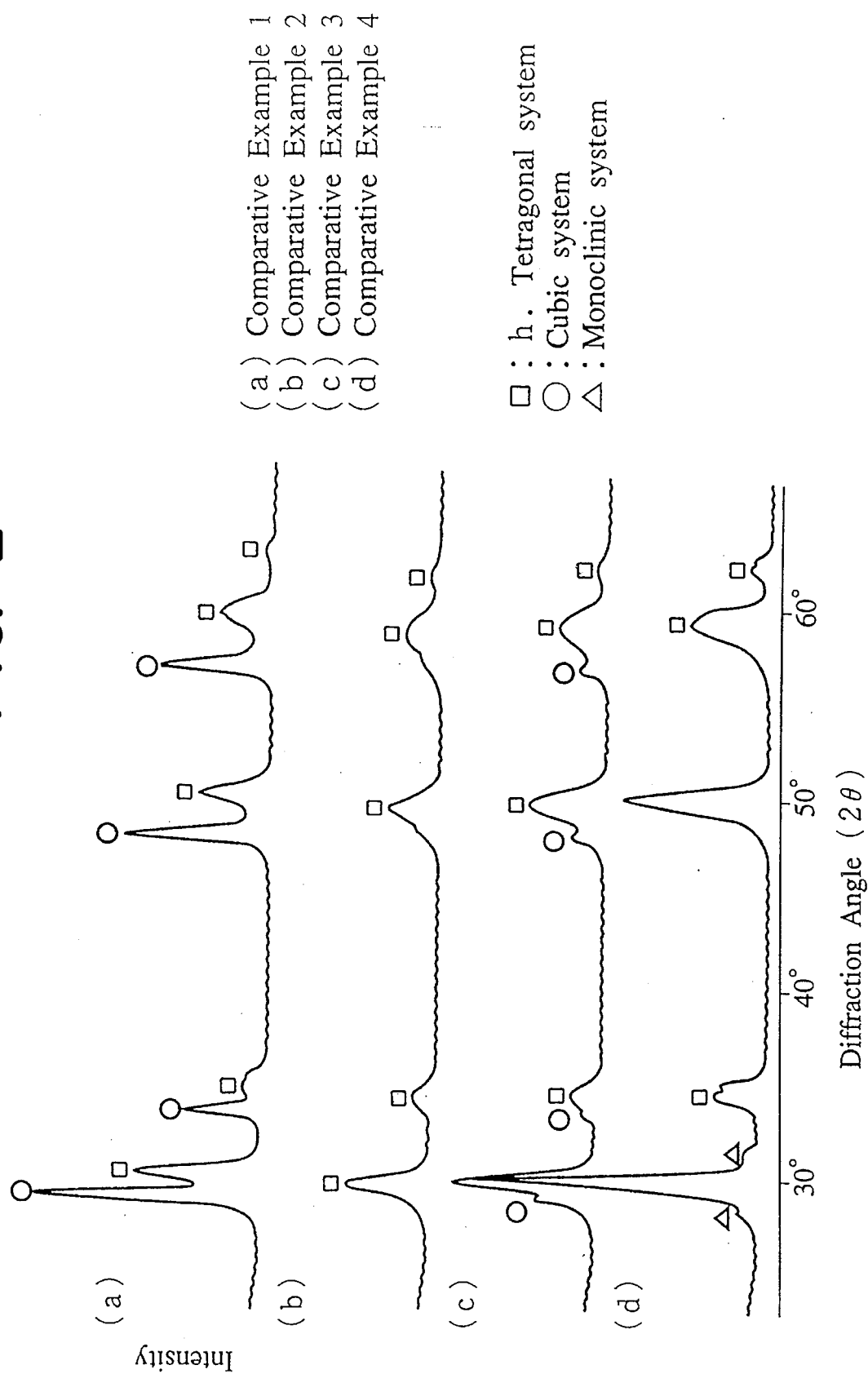

COMPOSITE OXIDE HAVING OXYGEN ABSORBING AND DESORBING CAPABILITY AND METHOD FOR PREPARING SAME

CROSS-REFERENCE TO RELATED APPLICATION

This application is a continuation-in-part application of application Ser. No. 08/263,608 filed Jun. 20, 1994, U.S. Pat. No. 5,478,543.

BACKGROUND OF THE INVENTION

This invention relates to a composite oxide having a novel crystal structure and exhibiting particularly excellent oxygen absorbing and desorbing capability which is utilizable for functional ceramics and for a catalyst for purifying exhaust gases, and a method for preparing the same.

Cerium oxide has hitherto been employed in large quantities as ceramics or as catalysts for purifying exhaust gases. In the field of catalysts, for example, cerium oxide is used for enhancing the purification rate of exhaust gas components such as hydrocarbons, carbon monoxide and $NO_x$, taking advantage of its characteristic properties of absorbing oxygen in an oxidative atmosphere and desorbing oxygen in a reducing atmosphere. In the field of ceramics, cerium oxide is used in the form of compounds or mixtures with other elements as electrically conductive ceramics such as solid electrolytes, taking advantage of its characteristic properties mentioned above. Such cerium oxide heretofore known is usually prepared, for example by adding oxalic acid or ammonium bicarbonate to a solution of nitrate or chloride of cerium, filtering and washing the resultant precipitate and drying followed by calcining.

However, the composite oxide prepared by the above method predominantly composed of cerium oxide has a drawback that it is incapable of sufficiently absorbing and desorbing oxygen at 400° to 700° C., and is deteriorated in performance after heating to a higher temperature, even though it exhibits the oxygen absorbing and desorbing capability.

Up to now, cerium-zirconium composite oxide exhibiting high oxygen absorbing and desorbing capability is known and disclosed in Japanese Laid-Open Patent Application No. 5-105428 (1993). For preparing the composite oxide, there is known a method including mixing, into a solution containing cerium, zirconium and hafnium ions, a solution containing other metal ions and an aqueous solution of ammonia, ammonium bicarbonate or oxalic acid, to form a compound salt precipitate, and calcining the compound salt precipitate at a temperature not lower than 300° C. However, the calcining temperature contemplated is not higher than 400° C., while there is no disclosure as the crystal structure of the composite oxide having Φ phase. Detailed scrutiny into the crystal structure of such oxide by Comparative Examples given hereinbelow has revealed that the structure is a mixed phase of a $CaF_2$-related structure phase, an h-tetragonal phase and a monoclinic phase. On the other hand, the tetragonal Φ phase has been known as the crystal phase (V. Longo and D. Minichelli, J. Amer. Ceramic Soc., 56(1973), 600.; P. Duran, M. Gonzalez, C. Moure, J. R. Jurado and C. Pascual, J. Materials Sci., 25(1990), 5001). It is reported that this phase is formed after annealing at 993K for several months, and extremely difficult to manufacture. On the other hand, there has not so far been known a composite oxide containing cerium oxide, zirconium oxide, hafnium oxide and other metal oxides and having Φ phase.

SUMMARY OF THE INVENTION

It is therefore an object of the present invention to provide a novel composite oxide exhibiting superior oxygen absorbing and desorbing capability and containing cerium oxide, zirconium oxide and hafnium oxide, and Φ phase as a crystal phase.

It is another object of the present invention to provide a method for easily producing on an industrial scale a composite oxide exhibiting superior oxygen absorbing and desorbing capability and containing Φ phase as a crystal phase.

The above and other objects of the present invention will become apparent from the following description.

According to the present invention, there is provided a composite oxide having oxygen absorbing and desorbing capability, which comprises 4.99–98.89% by weight of cerium oxide, 1–95% by weight of zirconium oxide, 0.01–20% by weight of hafnium oxide, and 0.1–10% by weight of an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof. The composite oxide includes Φ phase as a crystal phase, and has an oxygen absorbing and desorbing capability of at least 100 μmol/g at 400°–700° C.

According to the present invention, there is also provided a method for preparing a composite oxide having oxygen absorbing and desorbing capability which comprises the steps of mixing a first solution containing cerium ion, zirconium ion, hafnium ion and an additional metal ion with a second solution selected from the group consisting of an aqueous solution of ammonia, an aqueous solution of ammonium bicarbonate and an aqueous solution of oxalic acid to prepare a compound salt precipitate and calcining the precipitate at a temperature of at least 400° C. to form Φ phase. The additional metal ion is selected from the group consisting of titanium ion, tungsten ion, nickel ion, copper ion, iron ion, aluminum ion, silicon ion, beryllium ion, magnesium ion, calcium ion, strontium ion, barium ion, ion of rare earth metal other than cerium, and mixtures thereof.

According to the present invention, there is also provided a method for preparing a composite oxide having oxygen absorbing and desorbing capability which comprises the steps of mixing cerium oxide, zirconium oxide and hafnium oxide with an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof, molding the resulting mixture under compression and sintering the resulting molded product at 700°–1500° C. to form Φ phase as a crystal phase.

BRIEF DESCRIPTION OF THE DRAWINGS

FIG. 2 is a graphs showing X-ray diffraction patterns of composite oxides synthesized in Comparative Examples 1 to 4.

PREFERRED EMBODIMENTS OF THE INVENTION

Figure 1:
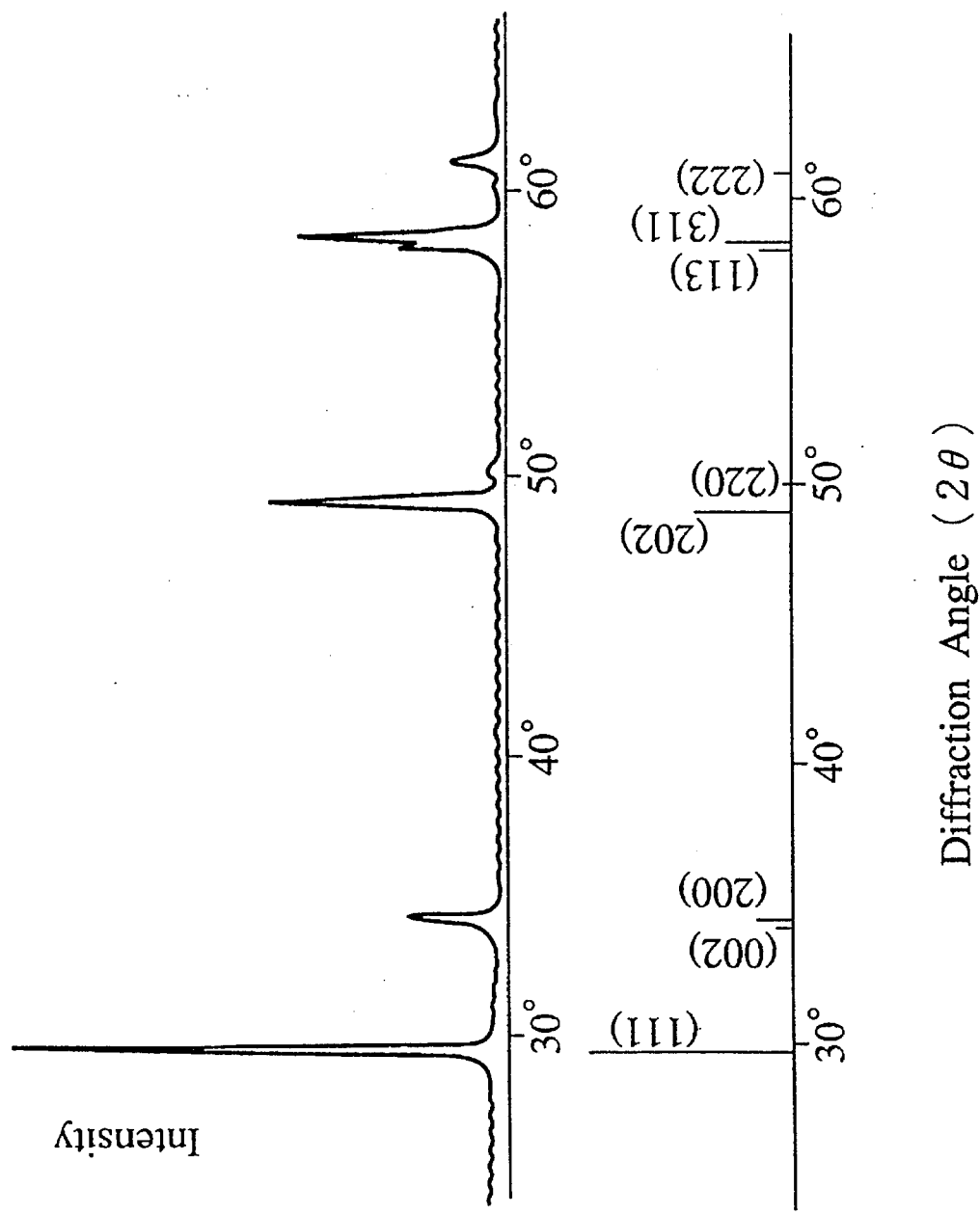
FIG. 1 is a graph showing the results of an X-ray diffraction pattern and a calculated pattern of a composite oxide having Φ phase synthesized in Example 1.

The present invention will now be explained in more detail hereunder.

The composite oxide of the present invention exhibiting oxygen absorbing and desorbing capability contains, as indispensable components, 4.99–98.89% by weight of cerium oxide, 1–95% by weight of zirconium oxide and 0.01–20% by weight of hafnium oxide. In addition, the composite oxide contains 0.1–10% by weight of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, or mixtures thereof. These additional components are referred to herein as an additional metal oxide. If the proportions of these components are outside of such range, the composite oxide is unable to display excellent oxygen absorbing and desorbing capability.

The composite oxide of the present invention exhibits oxygen absorbing and desorbing capability of not less than 100 μmol/g and preferably in a range of 100 μmol/g to 1000 μmol/g and more preferably in a range of from 150 μmol/g to 1000 μmol/g in a temperature range of 400° to 700° C. Such oxygen absorbing and desorbing capability results from change in valency of cerium in the composite oxide from 4 at the time of fabrication to 3 upon heating under deoxidation conditions, e.g. in a hydrogen stream. The zirconium and hafnium components contained in the composite oxide promotes the oxygen absorbing and desorbing capability and the valency thereof is constant at 4. In addition, the composite oxide of the present invention has Φ phase as a crystal phase. As the Φ phase, tetragonal Φ phase is known (V. Longo and D. Minichelli, J. Amer. Ceramic Soc., 56 (1973), 600.; P. Duran, M. Gonzalez, C. Moure, J. R. Jurado and C. Pascual, J. Materials Sci., 25 (1990), 5001). The formed Φ phase contains equal quantities of h-tetragonal phase and $CaF_2$-related structure phase. This Φ phase is a crystal phase exhibiting peaks in the (111), (002), (200), (202), (220), (113), (311) and (222) planes of the calculated X-ray diffraction pattern, and may be identified by X-ray diffraction. The calculation of X-ray diffraction pattern is described in B. D. Cullity "Summary of X-ray diffraction, New Edition" issued from KK AGNE and translated by Gentaro Matsumura (1983).

For preparing the composite oxide by the first method of the present invention, a first solution containing, in addition to cerium ion, zirconium ion and hafnium ion, an additional metal ion selected from the group consisting of titanium ion, tungsten ion, nickel ion, copper ion, iron ion, aluminum ion, silicon ion, beryllium ion, magnesium ion, calcium ion, strontium ion, barium ion, ions of rate earth metals other than cerium and mixtures thereof, is mixed with a second solution selected from the group consisting of an aqueous solution of ammonia, an aqueous solution of ammonium bicarbonate and an aqueous solution of oxalic acid, to prepare a compound salt precipitate. The solution containing cerium ion, zirconium ion and hafnium ion may be in the form of, for example, an aqueous solution of cerium nitrate and an aqueous solution of zirconium nitrate and hafnium nitrate. The additional metal ion may be any salt of ion if they can be in the form of an aqueous solution.

The concentration of the solution containing the cerium ion, zirconium ion and hafnium ion is preferably 30–200 g/liter and more preferably 50–100 g/liter in terms of composite oxide containing the above ions. On the other hand, the concentration of the solution of the additional metal ion is preferably 50–100 g/liter in terms of oxide containing the additional metal ion. The proportion of the cerium ion, the zirconium ion, the hafnium ion and the additional metal ion in terms of respective oxides is preferably 4.99–98.89:1–95:0.01–20:0.1–10. If the mixing ratio of the additional metal ion is less than 0.1% by weight, it becomes difficult to form the Φ phase.

The concentration of the aqueous ammonia solution, as the second solution mixed with the first solution is preferably 1–2N and more preferably 1–1.5N. The concentration of the aqueous ammonium bicarbonate solution as the second solution mixed with the first solution is preferably 50–200 g/liter and more preferably 100–150 g/liter, while that of the aqueous oxalic acid solution as the second solution mixed with the first solution is preferably 50–100 g/liter and more preferably 50–60 g/liter. The mixing ratio of the first solution containing the metal ions to the aqueous ammonia solution, the aqueous ammonium bicarbonate solution or the aqueous oxalic acid solution is preferably 1:1 to 1:10 in weight ratio.

The compound salt precipitate produced at this time may, for example, be a compound hydroxide or a compound carbonate.

The compound salt precipitate may be calcined for 1 to 10 hours at a temperature higher than 400° C., preferably at a temperature of 500°–1000° C. and more preferably at a temperature of 750°–1000° C. for producing a desired composite oxide having Φ phase. If the calcining temperature is not higher than 400° C., the desired Φ phase cannot be produced. The compound salt precipitate may also be previously hydrothermally treated before proceeding to the calcining process. The temperature and the processing time for the hydrothermal processing are preferably 100° to 135° C. and 0.5 to 1 hour, respectively.

For producing the composite oxide by the second method according to the present invention, an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium and mixtures thereof is admixed to cerium oxide, zirconium oxide and hafnium oxide, and the resulting mixture is molded under pressure and sintered at a pre-set specified temperature. As a zirconium oxide and hafnium oxide, a hafnium-containing zirconium oxide may also be employed. As for the proportions of the metal oxides, the composition of 4.99–98.89% by weight of cerium oxide, 1–95% by weight of zirconium oxide, 0.01–20% by weight of hafnium oxide and 0.1–10% by weight of the additional metal oxide is used. If the proportion of the mixing ratio of the other metal oxide is less than 0.1% by weight, it becomes difficult to produce Φ phase.

The metal oxides may be mixed together uniformly using a conventional ball mill. The mixed metal oxides are compression-molded into pellets under a pressure preferably of 200–1000 kg/cm$^2$ using, for example a compression molding machine. The resulting molded product is then sintered under heating for 1 to 10 hours at 700°–1500° C. and preferably 900°–1300° C. for producing a desired composite oxide having Φ phase. The resulting sintered product is preferably crushed by a crusher, such as a ball mill, preferably to have a particle size of 1.0 to 100 μm. If the sintering temperature is less than 700° C., the desired Φ phase cannot be formed, whereas if the temperature exceeds 1500° C., the oxygen absorbing and desorbing capability is undesirably lowered.

Since the composite oxide of the present invention contains cerium oxide, zirconium oxide and hafnium oxide as indispensable components, and having the Φ phase as a crystal phase, it displays oxygen absorbing and desorbing capability of not less than 100 μmol/g in a temperature range of 400°–700° C. Thus, the composite oxide of the present invention is highly useful as a substitute for conventional cerium oxide and cerium-zirconium composite oxide in the field of catalysts and functional ceramics. In addition, it is possible with the method of the present invention to produce the composite oxide having Φ phase easily and in a shorter time.

EXAMPLES OF THE INVENTION

The present invention will be explained with reference to Examples and Comparative Examples which are merely illustrative and are not intended for limiting the present invention.

Example 1

23.9 g of cerium oxide, (manufactured by SANTOKU METAL INDUSTRY CO., LTD. with a purity of 99.9%), 25.7 g of zirconium oxide containing 1.17% by weight of hafnium oxide, (manufactured by SANTOKU METAL INDUSTRY CO., LTD. with a purity of zirconium oxide of 98.83% by weight) and 0.4 g of commercially available calcium oxide with a purity of 99.9%, were mixed together in a ball mill. The resulting mixture was compression-molded by a compression molding machine under a molding pressure of 500 kg/cm$^2$ to form pellets, which were then sintered under an atmospheric pressure at 1500° C. for five hours. These pellets were then crushed in a ball mill to give 50 g of a composite oxide. The oxygen absorbing and desorbing characteristic properties of the produced composite oxide was then measured using an electrochemical oxygen pump type closed system oxygen analyzer disclosed in Shinya Yao and Zensaku Kozuka, Detection of the Phase Transitions of Praseodymium Oxide Thin Film by a Closed System Potentiostatic Technique Employing Solid Electrolyte, Journal of the Electro-Chemical Society of Japan, 61 No. 2, p262 (1993). The results are shown in Table 1. Analyses of the crystal structure of the produced composite oxide with an X-ray diffraction apparatus manufactured by SHIMADZU CORP., revealed that the crystal structure had Φ phase. The results are shown in FIG. 1. The composition of the resulting composite oxide was 57.7% by weight of cerium oxide, 41.0% by weight of zirconium oxide, 0.5% by weight of hafnium oxide and 0.8% by weight of calcium oxide.

Example 2

79 ml of an aqueous solution of cerium nitrate in terms of a cerium oxide concentration of 300 g/liter prepared by dissolving a high purity cerium nitrate solution (manufactured by SANTOKU METAL INDUSTRY CO., LTD. with a purity of 99.9%), 68 ml of a zirconium nitrate aqueous solution in terms of a zirconium oxide concentration of 25% by weight prepared by dissolving in water a zirconium nitrate solution containing 1.17% by weight of hafnium to the total weight of zirconium, and 8 ml of an aqueous solution of yttrium nitrate in terms of a yttrium oxide concentration of 100 g/liter prepared by dissolving yttrium nitrate (manufactured by SANTOKU METAL INDUSTRY CO., LTD., with a purity of 99.9%) were mixed together to prepare a solution containing cerium, zirconium, hafnium and yttrium ions with a composite oxide concentration of 50 g/liter and with a Ce:Zr:Hf:Y ratio by weight of 49.9:47.8:0.7:1.6.

To 1 liter of the resulting solution was added and mixed 1 liter of a separately prepared aqueous solution of ammonium bicarbonate with an ammonium bicarbonate concentration of 150 g/liter to give a precipitate of a compound carbonate containing cerium, zirconium, hafnium and yttrium.

The produced compound carbonate was calcined at 900° C. for five hours to give 50 g of a composite oxide. The composition of the composite oxide was 47.6% by weight of cerium oxide, 50.2% by weight of zirconium oxide, 0.6% by weight of hafnium oxide and 1.6% by weight of yttrium oxide. Besides, the composite oxide was found by X-ray diffraction to exhibit Φ phase. The oxygen absorbing and desorbing properties were measured of the resultinK composite oxide in the same way as in Example 1. The results are shown in Table 1.

Example 3

12.8 g of cerium oxide (manufactured by SANTOKU METAL INDUSTRY CO., LTD. with a purity of 99.9%), 36.9 g of zirconium oxide containing 1.17% by weight of hafnium oxide (manufactured by SANTOKU METAL INDUSTRY CO., LTD. with a purity of 98.83%), and 0.3 g of magnesium oxide (manufactured by WAKO PURE CHEMICAL INDUSTRIES LTD. with a purity of 99.9%), were mixed together in a ball mill. The resulting mixture was molded to give pellets by a compression molding device under a molding pressure of 500 kg/cm$^2$. The resulting pellets were sintered in atmosphere at 1300° C. for five hours. The pellets were crushed in a ball mill to give a composite oxide. The oxygen absorbing and desorbing properties were measured of the resulting composite oxide in the same way as in Example 1. The results are shown in Table 1. The composition of the composite oxide was 25.6% by weight of cerium oxide, 72.9% by weight of zirconium oxide, 0.9% by weight of hafnium oxide and 0.6% by weight of magnesium oxide. The X-ray diffraction of the crystal structure showed the presence of Φ phase.

Comparative Examples 1 and 2

Composite oxides were prepared by the wet co-precipitation method in the same way as in Example 2 except employing starting materials having the compositions shown in Table 1. The oxygen absorbing and desorbing properties were measured of the resulting composite oxides in the same way as in Example 1. The results are shown in Table 1. Also, X-ray diffraction was conducted in the same way as in Example 1. The results are shown in FIG. 2.

Comparative Examples 3 and 4

Composite oxides were prepared by the dry mixing sintering method in the same way as in Example 1 except employing starting materials having the compositions shown in Table 1. The oxygen absorbing and desorbing properties were measured of the resulting composite oxides in the same way as in Example 1. The results are shown in Table 1. Also, X-ray diffraction was conducted in the same way as in Example 1. The results are shown in FIG. 2.

TABLE 1

| | Composition (wt. % of oxide) | | | | | | Oxygen absorbing and desorbing capability |
|---|---|---|---|---|---|---|---|
| | Ce | Zr | Hf | Ca | Y | Mg | Oxygen μmol/g |
| Ex. 1 | 57.7 | 41.0 | 0.5 | 0.8 | — | — | 935 |
| Ex. 2 | 47.6 | 50.2 | 0.6 | — | 1.6 | — | 917 |
| Ex. 3 | 25.6 | 72.9 | 0.9 | — | — | 0.6 | 552 |
| Comp. Ex. 1 | 58.2 | 41.3 | 0.5 | — | — | — | 463 |
| Comp. Ex. 2 | 48.1 | 51.3 | 0.6 | — | — | — | 655 |
| Comp. Ex. 3 | 42.8 | 56.5 | 0.7 | — | — | — | 516 |
| Comp. Ex. 4 | 25.8 | 73.3 | 0.9 | — | — | — | 408 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A composite oxide having oxygen absorbing and desorbing capability, which comprises 4.99–98.89% by weight of cerium oxide, 1–95% by weight of zirconium oxide, 0.01–20% by weight of hafnium oxide, and 0.1–10% by weight of an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof, the composite oxide including Φ phase as a crystal phase, and having oxygen absorbing and desorbing capability of at least 100 μmol/g at 400°–700° C.

2. The composite oxide as claimed in claim 1, wherein the composite oxide has oxygen absorbing and desorbing capability of 100–1000 μmol/g at 400°–700° C.

3. The composite oxide as claimed in claim 1, wherein the Φ phase is a crystal phase showing peaks in (111), (002), (200), (202), (220), (113), (311), and (222) planes of X-ray diffraction pattern.

4. A method for preparing a composite oxide having oxygen absorbing and desorbing capability which comprises the steps of mixing a first solution containing cerium ion, zirconium ion, hafnium ion and an additional metal ion with a second solution selected from the group consisting of an aqueous solution of ammonia, an aqueous solution of ammonium bicarbonate and an aqueous solution of oxalic acid to prepare a compound salt precipitate and calcining the precipitate at a temperature of at least 400° C. to form Φ phase, said additional metal ion being selected from the group consisting of titanium ion, tungsten ion, nickel ion, copper ion, iron ion, aluminum ion, silicon ion, beryllium ion, magnesium ion, calcium ion, strontium ion, barium ion, ion of rare earth metal other than cerium, and mixtures thereof.

5. The method as claimed in claim 4 wherein a proportion of the cerium ion, the zirconium ion, the hafnium ion and the additional metal ion, calculated as respective oxides, is 4.99–98.89:1–95:0.01–20:0.1–10.

6. The method as claimed in claim 4 wherein the second solution is an aqueous solution of ammonia having a concentration of 1–2N.

7. The method as claimed in claim 4 wherein the second solution is an aqueous solution of ammonium bicarbonate having a concentration of 50–200 g/l.

8. The method as claimed in claim 4 wherein the second solution is an aqueous solution of oxalic acid having a concentration of 50–100 g/l.

9. The method as claimed in claim 4 wherein the first solution is mixed with the second solution in a weight ratio of from 1:1 to 1:10.

10. The method as claimed in claim 4 wherein the compound salt precipitate is calcined at 500°–1000° C. for 1–10 hours.

11. The method as claimed in claim 4 wherein the compound salt precipitate is subjected to hydrothermal treatment conducted at 100°–135° C. for 0.5–1 hour before said precipitate is calcined.

12. A method for preparing a composite oxide having oxygen absorbing and desorbing capability which comprises the steps of mixing cerium oxide, zirconium oxide, and hafnium oxide with an additional metal oxide selected from the group consisting of titanium oxide, tungsten oxide, nickel oxide, copper oxide, iron oxide, aluminum oxide, silicon oxide, beryllium oxide, magnesium oxide, calcium oxide, strontium oxide, barium oxide, oxides of rare earth metals other than cerium, and mixtures thereof, molding a resulting mixture under compression and sintering a resulting molded product at 700°–1500° C. to form Φ phase as a crystal phase.

13. The method as claimed in claim 12 wherein a proportion of the cerium oxide, the zirconium oxide, the hafnium oxide and the additional metal oxide is 4.99–98.89:1–95:0.01–20:0.1–10 by weight.

14. The method as claimed in claim 12 wherein the cerium oxide, the zirconium oxide, the hafnium oxide and the additional metal oxide are molded under a pressure of 200–1000 kg/cm$^2$.

15. The method as claimed in claim 12 wherein the molded product is sintered for one to ten hours.

* * * * *

UNITED STATES PATENT AND TRADEMARK OFFICE
CERTIFICATE OF CORRECTION

PATENT NO. : 5,580,536

DATED : December 3, 1996

INVENTOR(S) : Shinya YAO et al.

It is certified that error appears in the above-indentified patent and that said Letters Patent is hereby corrected as shown below:

Title page, [75], Inventors, change "Shinyao Yao" to --Shinya Yao--.

Signed and Sealed this

Twenty-ninth Day of April, 1997

Attest:

BRUCE LEHMAN

Attesting Officer

Commissioner of Patents and Trademarks